E. H. TRUMP.
TIRE MOLD.
APPLICATION FILED SEPT. 18, 1919.

1,375,543.

Patented Apr. 19, 1921.
2 SHEETS—SHEET 1.

Inventor
E. H. Trump

By F. E. Shannon

Attorney

E. H. TRUMP.
TIRE MOLD.
APPLICATION FILED SEPT. 18, 1919.
1,375,543.
Patented Apr. 19, 1921.
2 SHEETS—SHEET 2.
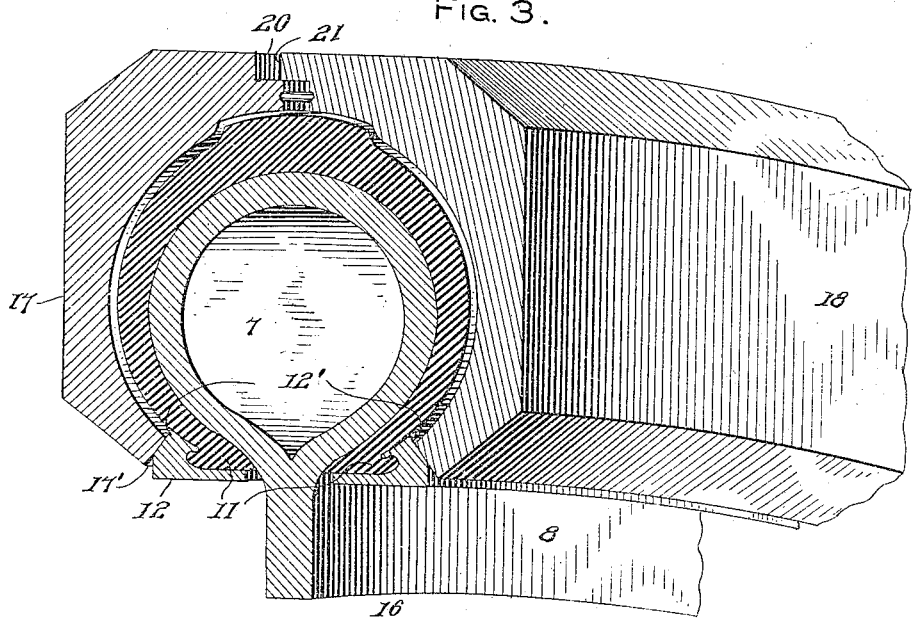
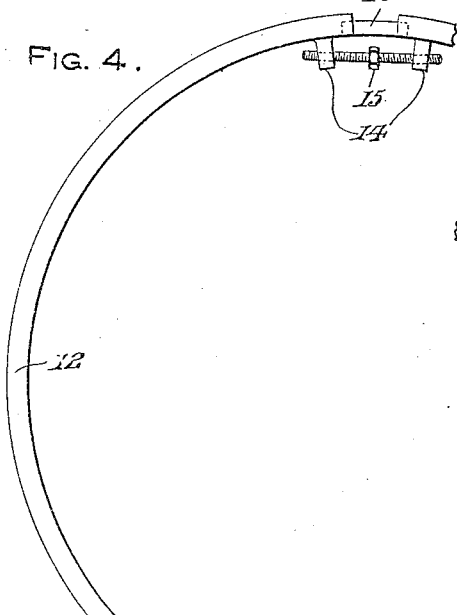
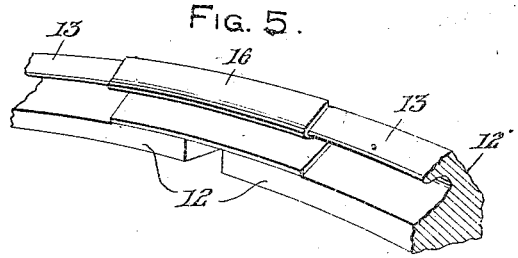
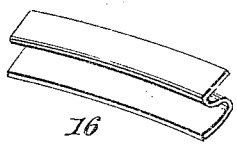
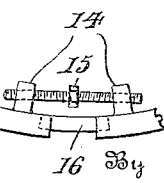
Inventor
E. H. Trump
F. E. Shannon
By
Attorney

UNITED STATES PATENT OFFICE.

ELNO H. TRUMP, OF BARBERTON, OHIO.

TIRE-MOLD.

1,375,543. Specification of Letters Patent. Patented Apr. 19, 1921.

Application filed September 18, 1919. Serial No. 324,307.

*To all whom it may concern:*

Be it known that I, ELNO H. TRUMP, a citizen of the United States, residing at Barberton, in the county of Summit and State of Ohio, have invented new and useful Improvements in Tire-Molds, of which the following is a specification.

This invention relates to tire building molds and aims to provide an efficient and economical means for stretching the carcass of a tire during vulcanization.

The invention is especially adapted for use in constructing pneumatic tire casings of the clencher type which are built up of layers of cords or threads. Such tires are ordinarily constructed by building up the tire carcass on a rigid core. The core is then removed from the carcass and an air bag is positioned within the cavity of the carcass.
The carcass is then placed within the cavity of a two-part mold and fluid pressure is introduced into the air bag to stretch the tire during the vulcanization thereof. This ordinary method is very expensive.

The primary object of this invention is therefore to provide a vulcanizing device which will stretch the carcass of the tire and which may be used with the ordinary tire building core so that the core need not be removed during the vulcanization of the tire.

My invention contemplates the provision of a tire mold wherein there is employed a pair of clamping rings associated with the clencher portions of a tire shoe and positioned outwardly of a mold core with mold clamping sections inclosing a tire shoe on the core and engaging the rings.

A further object of the invention is to provide an extensible ring for a tire shoe mold wherein the ends are connected together by a turn buckle device with a comparatively thin metallic sheet overlying the joint of the ring sections to insure an even molded surface after vulcanization of the shoe.

A still further object of the invention resides in the provision of a pair of oppositely sides in the provision of a pair of oppositely positioned extensible shoe engaging rings with the outer faces thereof adapted to be engaged by the inner edges of the mold sections, the engaging faces of the rings and mold sections being oppositely beveled to cause an easy sliding movement of the engaging faces during the assembling of the mold sections on the core.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and in which like reference characters designate corresponding parts throughout the several views, Figure 1 is a cross sectional view of a tire shoe mold constructed in accordance with the present invention, the different sections being shown in their initial positions of assemblage.

Fig. 3 is a fragmentary perspective view in section of a tire shoe mold with the ring engaging stops on the core removed.

Fig. 4 is a side elevational view of one of the rings, the same being broken away and illustrating the turn buckle connection between the adjacent ends of the ring sections with the thin metal plate overlying the connections.

Fig. 5 is a fragmentary perspective view of one of the ring joints with the metal plate overlying the joint, and,

Fig. 6 is a perspective view of the joint plate.

Briefly described, the present invention aims to provide a tire shoe mold wherein the core carries an inwardly directed central flange upon which, in the preferred construction, stops or shoulders are provided and are adapted to be engaged by the clencher rings for limiting the stretching of a tire over the core. The mold clamping sections have a sliding connection at their outer edges while the inner ends slidably engage the outer faces of the clencher rings for moving the same in directions toward the core flange and ultimately contacting the outer sides of the tire shoe. Each clencher ring is formed of two semi-circular sections having the adjacent ends connected by a turn buckle device while a thin metal plate substantially S-shaped in cross section is associated with the adjacent ring ends to insure an even molded finished surface on that part of the shoe contacting the ring.

Figure 1:
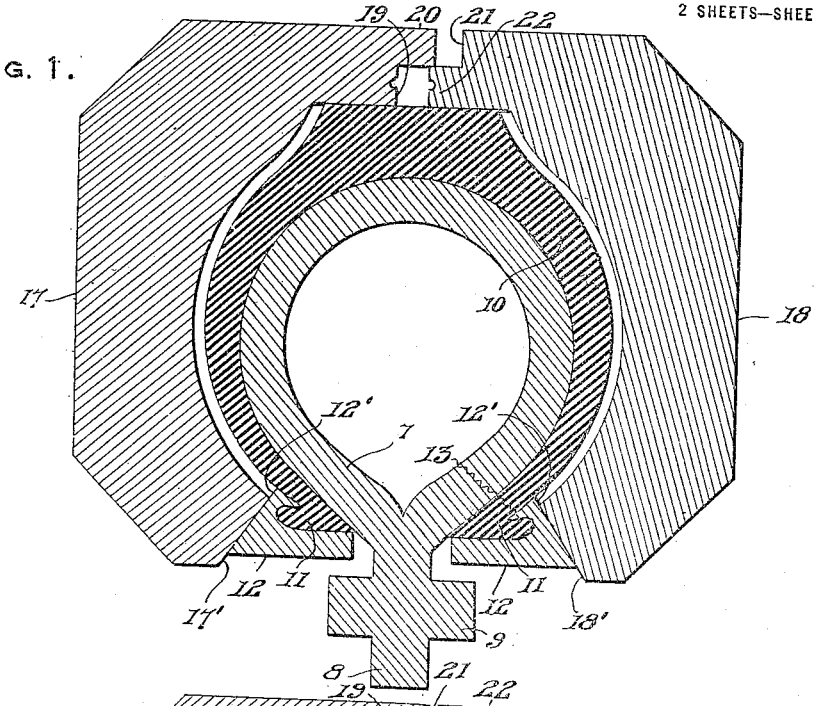
Figure 2:
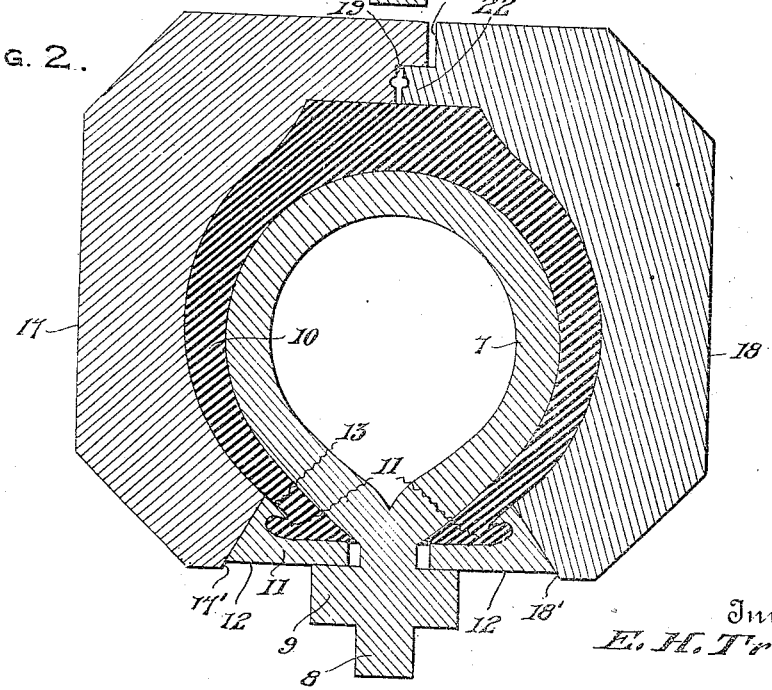
Fig. 2 is a view similar to Fig. 1 with the tire shoe tightly stretched about the mold core and with the mold clamping sections in their closed position, with the clencher engaging rings engaging the core stops.

Referring more in detail to the accompanying drawings, there is illustrated a tire core 7 of hollow construction and having formed integral with the inner side thereof an inwardly directed flange 8, the preferred forms in Figs. 1 and 2 showing stops 9 projecting laterally at opposite sides of the flange 8 while in Fig. 3 the flange 8 is free of these stops or blocks.

The present tire mold is equally adaptable for the vulcanization of tires of practically solid rubber formation and also where the tires are constructed of cord or like material that must be stretched during vulcanization, the tire shoe 10 being positioned on the core ring 7 with clencher portions 11 formed at the inner edges thereof.

Sectional clencher-engaging rings 12 are adapted for engagement with the clencher portions 11 of the tire shoe at opposite sides of the core 7, and each ring is preferably formed of two parts as indicated in Fig. 4, the same embodying a flanged portion 13 engaging the clencher portion 11 of said shoe. Inwardly directed lugs 14 are carried by the inner faces of adjacent ring section ends and have threaded openings therein with which a threaded turn buckle 15 is associated for purposes of varying the size of the ring to clamp the same about the clencher portion of a tire shoe.

As shown more clearly in Figs. 5 and 6 a join plate 16 is adapted to overlie the meeting ends of the ring, the same being substantially S-shaped in cross section for over and under the flange 13 of the ring and also the body portion of the ring and being carried by the inner face of the ring engages the adjacent portion of the clencher portion 11 of the tire shoe. The form of ring employed in Figs. 1 and 3 is identical with the exception that the flange of the core is free of all obstructions in Fig. 3 and no limiting stops are provided for the clencher rings. As shown in Figs. 1 and 2 the molding blocks 17 and 18 are arranged at opposite sides of the shoe 10 and completely inclose the same, the inner faces of the molding blocks 17 forming the outer face of the tire shoe, and as illustrated, the sides of the shoe are curved to form a tread section to increase the cross sectional area.

The outer meeting edges of the mold blocks 17 and 18 have a sliding overlapping connection at the periphery of the tread of the shoe, the section 17 being cut away as at 19 to provide an overhanging flange 20 received in the outer cut away portion 21 of the mold block 18 which cut away portion 21 provides an underlying flange 22 received in the cut away portion 19 of the block 17. The inner edges of the blocks 17 and 18 are provided with beveled faces 17' and 18' that are adapted for sliding reception on corresponding beveled faces 12' formed on the outer sides of the ring 12.

In the operation of the device, the tire 10 having been constructed of the desired material such as rubberized fabric with strips of rubber or fabric and cord sheets and rubber, or in fact of any desired formation, the same is placed upon the core 7 and the rings 12 having the flanges 13 thereof engaging the clencher portions of the ring of the tire. The mold blocks 17 and 18 are then positioned to inclose the tire 10 and overlapping flanges 20 and 22 sealing the outer end of the mold while the inner beveled edges 17' and 18' engage the corresponding faces 12' of the rings 12. By compressing the mold blocks 17 and 18 on the shoe by suitable clamps, the shoe is stretched over the core 7 until the rings 12 contact the stops 9 upon the core flange 8. During this stretching movement of the shoe and the translation of the rings 12 the relative positions of the engaging faces 12', and 17' and 18' change by sliding contact, during which movement the turn buckles 15 are operated for purposes of drawing the ends of the sections of the ring 12 into closer relationship while the plate 16 overlying the ring joints prevents the adjacent portion of the tire shoe from becoming pinched between the ring ends and for protection of the same. It will therefore be seen by reference to Fig. 2 that the shoe 18' assumes an exterior contour during the vulcanization of the same similar to the inner faces of the mold blocks 17 and 18 and the rings 12.

In the form of the invention shown in Fig. 3 the flange 8 upon the core 7 is free of stops or projections while the mold blocks 17 and 18 engage the rings 12 in a like manner as described in connection with Figs. 1 and 2, but in this form of the invention, the tread portion of the tire differs in that the tread portion thereof is provided with a continuously curved enlarged portion contrasted with the flat tread of the tire shown in Figs. 1 and 2, this change being afforded by the modification form of the inner faces of the mold sections 17 and 18, but in other respects in point of construction and operation, the inventions are the same.

While the above description refers to the combination of the mold sections 17 and 18, with the split ring 12 embodying the turn buckle 15 at its adjacent ends it is to be understood that in the formation or stretching of a tire 10 over the core 7 the mold sections 17 and 18 may be eliminated and by tightening the turn buckle connections 15 the clencher rings 12 will exert sufficient force in stretching the tire 10 to the desired point where the rings 12 engage the stops 9 upon the core flange 8. When the molding blocks 17 and 18 are used the turn buckle connections 15 may be removed from the rings 12, and the beveled faces 17' and 18' of the blocks engaging the beveled faces 12' of the rings will force the rings into closer relationship with the core flanges 8 and render the use of the turn buckle unnecessary.

It is to be understood that I desire to protect in this application the three methods of stretching the tire shoe 10, first, the use of the split rings with the turn buckles to the exclusion of the molding blocks 17 and 18, second, the use of the molding blocks 17 and 18 engaging the split rings 12 to the exclusion of the turn buckles 15, and third, the combination of the turn buckles 15 with the rings 12 and the molding plate blocks 17 and 18.

While the form of the invention herein shown and described is what is believed to be the preferred embodiment thereof, it is nevertheless to be understood that various forms, modifications and arrangements of parts may be made without departing from the spirit and scope of the invention as claimed.

What I claim as new and desire to secure by Letters Patent is:—

1. A tire mold embodying a core, molding blocks positioned at opposite sides thereof, and tire stretching rings associated with the inner edges of the molding blocks, the engaging faces of the molding blocks and rings being beveled and arranged to cause the rings to be moved relative to the core flange.

2. A tire mold embodying a core, molding blocks positioned at opposite sides thereof, and tire stretching rings associated with the inner edges of the molding blocks, said rings being formed of sections and threaded connections between the adjacent section ends.

3. A tire mold embodying a core, molding blocks positioned at opposite sides thereof, tire stretching rings associated with the inner edges of the molding blocks, said rings being formed of sections, threaded connections between the adjacent section ends, and relatively thin metal plates overlying the joint between the ring sections.

4. A tire mold embodying a core, molding blocks positioned at opposite sides thereof, tire stretching rings associated with the inner edges of the molding blocks, said rings being formed of sections, threaded connections between the adjacent section ends and relatively thin metal plates overlying the joints between the ring sections, said plates being positioned completely over the tire engaging faces of the ring.

5. A tire mold embodying a core, molding blocks positioned at opposite sides thereof, tire stretching rings associated with the inner edges of the molding blocks, and an overlapped sliding connection between the outer edges of the mold blocks.

6. A tire mold embodying a core, molding members positioned at opposite sides thereof, contractible tire stretching rings associated with the inner edges of the molding members, an inwardly directed flange carried by the core and means carried by said flange adapted to be engaged by said rings to limit the contraction thereof.

7. A tire mold embodying a core, molding members positioned at opposite sides thereof, contractible tire stretching rings associated with the inner edges of the molding members, an inwardly directed flange carried by the core, and lateral stops carried by said flange adapted to be engaged by said rings to limit the contraction thereof.

8. A tire mold including a core, sectional rings associated therewith, and molding members adapted to engage and contract the sectional rings for stretching the tire over the core.

9. A tire mold including a core, sectional rings associated therewith, molding blocks adapted to engage the sectional rings for stretching the tire over the core, and a relatively thin metal strip overlying the joint between the ring sections.

10. In combination, a tire core and means to reduce the circumference of the inwardly extending edges of a tire positioned on said core.

11. In combination, a tire core and a contractible ring, said ring adapted to engage the inwardly projecting edges of a tire positioned on said core, and means to contract said ring.

12. In combination, a tire building core and a tire mold, and means to reduce the circumference of the inwardly extending edges of a tire positioned on said core, said means automatically operatable when said core carrying said tire is clamped within the cavity of said mold.

In testimony whereof I have hereunto set my hand.

ELNO H. TRUMP.